United States Patent [19]

Churchland et al.

[11] Patent Number: 4,563,237
[45] Date of Patent: Jan. 7, 1986

[54] ORIENTED STRAND LAY-UP

[75] Inventors: Mark T. Churchland, Vancouver; Walter W. Schilling, Delta, both of Canada

[73] Assignee: MacMillan Bloedel Limited, Vancouver, Canada

[21] Appl. No.: 547,578

[22] Filed: Nov. 1, 1983

[51] Int. Cl.⁴ ............................. B29J 5/02; B29J 5/04
[52] U.S. Cl. ................................. 156/62.2; 156/296; 264/24
[58] Field of Search ............... 156/62.2, 62.4, 296; 264/24

[56] References Cited

U.S. PATENT DOCUMENTS

| | | | |
|---|---|---|---|
| 1,416,687 | 5/1922 | Butler | 17/63 |
| 3,033,726 | 5/1962 | Howden | 156/62.6 |
| 3,115,431 | 12/1963 | Stokes | 264/113 |
| 3,202,743 | 6/1965 | Elmendorf | 425/8.1 |
| 3,478,861 | 11/1969 | Elmendorf | 198/383 |
| 3,493,021 | 2/1970 | Champigny | 144/348 |
| 3,515,255 | 6/1970 | Lee | 198/382 |
| 3,807,931 | 4/1974 | Wood | 425/449 |
| 3,843,756 | 10/1974 | Talbott | 264/24 |
| 3,856,602 | 12/1974 | Colijn | 156/62.4 |
| 3,883,333 | 5/1975 | Ackley | 156/62.2 |
| 3,896,536 | 7/1975 | Keller | 425/83 |
| 4,058,201 | 11/1977 | Etzold | 198/382 |
| 4,061,819 | 12/1977 | Barnes | 156/62.2 |
| 4,111,294 | 9/1978 | Carpenter | 264/24 |
| 4,113,812 | 9/1978 | Talbott | 264/24 |
| 4,146,123 | 3/1979 | Cottrell | 198/382 |

FOREIGN PATENT DOCUMENTS 816285 7/1959 United Kingdom .

Primary Examiner—Peter Kratz
Assistant Examiner—Timothy W. Heitbrink
Attorney, Agent, or Firm—Banner, Birch, McKie & Beckett

[57] ABSTRACT

A process for continuously forming a product having elongated members at least about one foot long which are oriented, compressed and bonded is provided, the process comprising depositing elongated members on a moving carrier with an orientation that is substantially parallel to the direction of movement of said carrier, said members being deposited on said carrier over a length of carrier that is at least as long as about one and one-half times the length of the elongated members and is at least as long as about 30 times the final thickness of the compressed, composite product.

12 Claims, 8 Drawing Figures

ORIENTED STRAND LAY-UP

The present invention relates to a continuous process and apparatus for depositing elongated members in a lay-up with each member oriented substantially in the longitudinal direction of the lay-up. The elongated members may subsequently be bonded together into a composite product.

A product containing oriented elongated members or strands is disclosed in Barnes U.S. Pat. No. 4,061,819. That patent is directed to a composite wood product which utilizes elongated wood strands. In such product wood strands having a length in excess of about 2 feet are coated with a resin and are positioned in substantially parallel relationship in a long form which may have a width of, for example, 12 inches. The strands are deposited with their ends in overlapping relationship to provide a roughly uniform distribution along the length of the form. The strands are then compressed and heated to cure the resin and provide the final structural product which can have a strength equal to prime structural lumber.

In preparation of composite strand products by batch methods, strands can be positioned by hand with no significant loss in strength due to disoriented strands. However, when composite strand products are made using a continuous process, the strands are usually deposited on a moving conveyor belt so that the ends overlap. For example, the leading edge of each strand will tend to overlap with strands preceding it onto the conveyor while the trailing edge of the strand will tend to settle lower into the form. (See, e.g., Champigny U.S. Pat. No. 3,493,021). The angles at which the strands are generally positioned are not random, but rather tend to be similar in both magnitude and direction. Hence, the majority of the strands may be oriented away from the horizontal direction in mutually parallel fashion. Such a lay-up mat has what may be referred to as "card-decking" orientation, in that each strand is at an angle to the longitudinal direction of the lay-up mat. It has been discovered that excessive vertical strand angle may also result in vertical curvature in the continuously compressed product.

In the manufacture of composite products of the type disclosed in Barnes U.S. Pat. No. 4,061,819 regulation of the orientation of the elongated members is important to obtain full product strength. If the strands are positioned at an excessively large angle (either vertically or laterally) to the longitudinal direction of the form, the composite products tend to have less strength than their full strength potential.

As disclosed in the Barnes patent, wood strands which have been cut or split along the grain of the wood are normally used in making composite products. However, when such strands are incorporated in a lay-up mat at significant angles to the horizontal, the product strength is reduced. Therefore, although formation of a composite product on a continuous basis is desirable, the strength of the composite product may be significantly lowered from the full strength potential.

It is an object of this invention to provide a continuous method for manufacturing a composite product in which elongated members are oriented substantially parallel to the longitudinal direction of the composite product.

It is a further object of this invention to provide a continuous method of manufacturing a composite product substantially free of vertical curvature in which elongated members are oriented substantially parallel to the longitudinal direction of the composite product.

It is another object of this invention to provide a continuous method for manufacturing composite structural lumber made up of elongated wood strands.

It is still another object of this invention to provide apparatus for producing composite products in which elongated members are oriented substantially parallel to the longitudinal direction of the composite products.

It is also an object of this invention to provide a continuous method and apparatus for manufacturing a composite product containing elongated members in which the members have an average vertical angle of not more than about 2°.

According to this invention, a process for continuously forming a product having elongated members at least about one foot long which are oriented, compressed and bonded is provided, the process comprising depositing elongated members on a moving carrier with an orientation that is substantially parallel to the direction of movement of said carrier, said members being deposited on said carrier over a length of carrier that is at least as long as about one and one-half times the length of the elongated members and is at least as long as about 30 times the final thickness of the compressed, composite product.

It has been found that the problem caused by card-decking in the production of lay-up mats comprising elongated members such as wood strands by continuous lay-up operations may be virtually eliminated by continuously laying strands at a substantially uniform rate over a predetermined length Y of a moving conveyor. More specifically, continuous lay-up procedures may be carried out so that vertical orientation of the elongated members is with X degrees of the longitudinal direction in the continuous composite product. Generally, X should be not more than about 2°, preferably X is not more than about 1½°, more preferably not more than about 1°, and most preferably X is not more than about ½°.

The parameters for such lay-up procedures are mathematically determined. The length (Y) of moving conveyor over which the strands should be continuously laid is equal to the height (thickness) (Z) of the compressed product being produced multiplied by the cotangent of X degrees. When X equals 2°, the cotangent is approximately 30 (28.6). Hence, (conveyor length)=30×(finished product height). Where X is 1½°, the cotangent is approximately 40 (38.2), where X=1°, the cotangent is approximately 60 (57.3) and where X is ½°, the cotangent is approximately 110 (114.6). While the preferred maximum strand angle is 2°, the general formula $[Y = (\text{cotangent } X°) \times Z]$ may readily be applied to achieve strand lay-ups with any other maximum degree of strand disorientation, having a desired height (thickness) of the product in the final compressed state. While depositing strands from a single location onto a moving belt may be satisfactory if the coverage strand length is long compared to the thickness of the mat, use of a single location is not satisfactory if the length Y required for an angle X of 2° is more than about one and one-half times the average length of the strands employed and it is in such situations that the present invention is useful.

The invention also provides apparatus for continuously laying elongated members in a lay-up mat with each member oriented substantially in the longitudinal direction of the lay-up at a low vertical angle. Additional embodiments of the invention will be made clear in the discussion below.

The invention will be better understood by reference to the drawings which illustrate embodiments of the invention.

Figure 1:
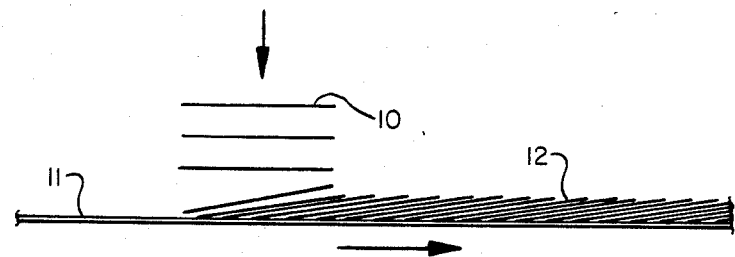
FIG. 1 is a schematic side elevational view of a conventional lay-up process according to the prior art.

FIG. 1 is a schematic illustration of the card-decking phenomenon as encountered in prior art lay-up procedures of the type disclosed, for example, in Champigny U.S. Pat. No. 3,493,021. If elongated strands 10 are placed on a conveyor 11 from a single source which does not move longitudinally along the conveyor to form a lay-up mat 12, substantial card-decking occurs. One end of each newly deposited elongated strand may rest on the conveyor 11 but the strand will slope upwardly to rest on a previous strand in the mat. FIG. 1 illustrates a situation in which the strands are oriented at a considerable angle.

Figure 2:
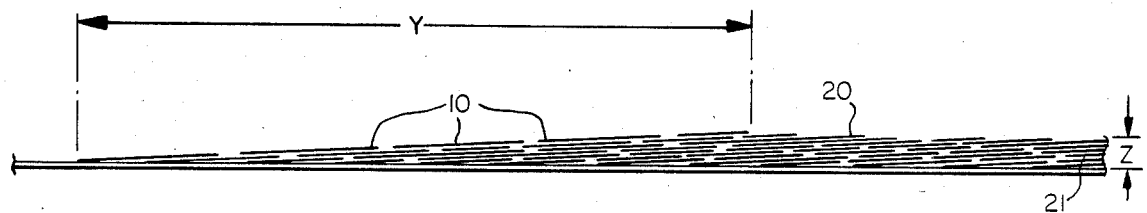
FIG. 2 is a schematic side elevational view of a lay-up made according to the present invention.

FIG. 2 illustrates a lay-up mat made according to the present invention in which elongated strands 10 are in a lay-up mat 21 such that the average angle of the strands is no more than about 2° to the horizontal in the compressed or final product. The dimension Y represents the length over which elongated strands 10 are deposited at a substantially uniform rate in the lay-up mat 12. This dimension varies depending on the desired height of the final product. The thickness of the final product in relation to the height Z of the lay-up will vary somewhat depending upon the strand dimensions and final product density. As discussed below, when using wood strands, the ratio often will be about one-third with wood strands.

The elongated members or strands which are preferably employed in the practice of this invention generally will have a length of at least about 1 or 2 feet and preferably a length of at least about 3 feet. In any of the above cases, strands may have lengths of about 8 feet or more. The strands will often have a width and thickness of from about 1/16 inch to about 1 inch and more preferably from about ⅛ inch to about ½ inch. It is possible and often probable that elongated members, such as strands, used for assembly of a product will vary in length from a minimum to a maximum length (e.g., from about 2 to about 8 feet). In such case, the minimum length over which lay-up occurs is about one and one-half times the length of the longest strands. As noted earlier, the strands are desirably wood strands that are split or cut parallel to the grain of the wood.

The strands may be coated with any suitable adhesive. Phenol-formaldehyde resins are commonly employed in the art for wood products and are preferred for the practice of this invention. Other phenolics (e.g., containing resorcinol, cresol, or the like) as well as other adhesives, such as isocyanates, urea formaldehydes or others can also be used in conjunction with the strands. While the invention will be described with respect to strands coated with adhesive, it will be understood that the lay-up mat be formed and thereafter contacted with adhesive.

After the resin-coated strands are deposited as a lay-up mat containing oriented strands in a substantially uniform distribution, the mat is compressed and the resin is cured (most often by heat) to produce the final product. The amount of compression will obviously vary depending on a number of factors including the compressibility of the strands and the desired density of the final product. A compression ratio of 3:1 (i.e., a 12 inch high mat compressed to a 4 inch high final product) is not uncommon and either higher or lower compression ratios can be employed depending on the type of strands used and the desired density of the final product. The selection of suitable compression ratios is within the skill of the art. Stated somewhat differently, the art can readily select the thickness of mat which will provide the desired product by simple preliminary compression tests. When wood strands are employed, final products often will have a wood density (i.e., the density of the wood portion of the final product) of from about 1 to about 1½ times the original density of the wood. It should be noted that the length of the lay-up in accordance with this invention is determined based on the final compressed thickness of the product. Most often, the final compressed product will have a thickness of at least about 1 inch and often at least about 2 inches. Indeed, having a compressed thickness of at least about 4 inches or at least about 8 inches are feasible. The width of the lay-up can vary widely. Widths of 12 inches to 30 inches or more are entirely feasible.

Generally, the lay-up mat will be conducted horizontally through a press and be pressed vertically which will, of course, reduce the height of the lay-up. It is possible, however, that the mat can be pressed from the sides. In such event, the mat height will be substantially the same as the finished height and angle calculations should be made accordingly.

Figure 3:
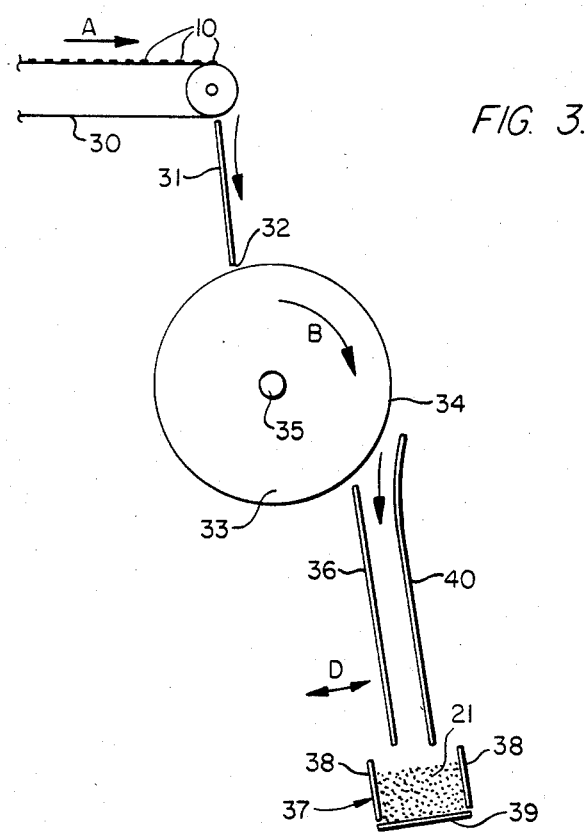
FIG. 3 is a schematic cross-sectional side view of one embodiment of the apparatus of the present invention for laying elongated members in a lay-up mat.
Figure 4:
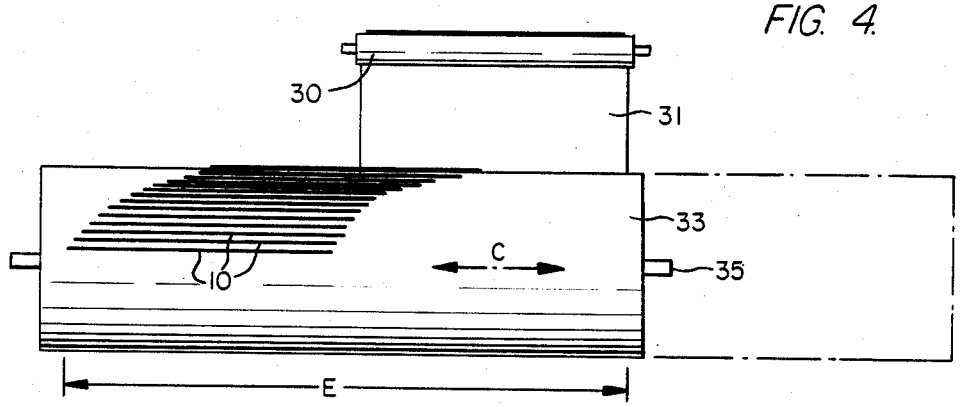
FIG. 4 is a front view of portions of the embodiment shown in FIG. 3.

An apparatus which may be used in the practice of the present invention is illustrated in FIGS. 3 and 4. Elongated strands 10 are placed side-by-side in a substantially parallel relationship on a conveyor 30. The conveyor 30, which is positioned approximately midway of the transverse travel of drum 33, moves the strands 10 in a direction, as shown by arrow A. The conveyor is desirably at least as wide as the strands are long. Each strand 10 travels to the end of the conveyor 30 and drops onto a guide 31 which directs it to the surface of rotating drum 33 at location 32. In the embodiment shown, the strands are retained in position 32 on the rotating drum by a friction surface (e.g., a paper machine felt fabric). Friction prevents the strand from sliding on the drum surface. Other strand restraining means can also be employed. For example, a drum with grooves can also be used.

Drum 33 rotates in the direction of Arrow B and also reciprocates along the drum axis 35 (FIG. 4, Arrow C) so that strands 10 are dropped onto drum 33 in a progressive pattern as illustrated in FIG. 4. The progression of strand positioning preferably extends along the full length of the drum 33, but this is optional.

When the strands have traveled on the rotating drum 33 to a predetermined radial position 34, which is normally about a quarter of a rotation, the strands 10 fall away from the drum 33 and into trough 37. The strands may be guided by sliding down a surface 36 which reciprocates backwards and forwards across the width of a lay-up trough 37 (as indicated by Arrow D in FIG. 3) so that the strands 10 are distributed across the full width of lay-up 21. If desired, distribution across the lay-up can be achieved by reciprocating trough 37 laterally. The lay-up trough 37 has a moving conveyor belt 39 and sides 38.

If desired, a flexible cover 40 may be positioned over the face of the chute 36 as shown in FIG. 3. The cover 40 serves to minimize side-to-side flutter of strands sliding down the face of member 36, thus minimizing horizontal disorientation of strands. Such a cover may be made out of flexible plastic, cloth, or the like.

The rotational and reciprocating speeds of the drum 33 are chosen so that the residence time of a strand on the drum is approximately equal to a $n+\frac{1}{2}$ cycle time of the drum's reciprocating cycle (where n is an integer). In other words, the strand residence time on the drum is, for example, a $\frac{1}{2}$, $1\frac{1}{2}$ or $2\frac{1}{2}$ multiple of the drum's reciprocating cycle time. The feed rate of strands to the drum will equal the deposit rate of strands into trough 37. The correlation of deposit rate of strands into the trough with conveyor speed is within the skill of the art. It will be appreciated from the above discussion that the drum will have an effective length over which strands are carried (E) equal to one-half the lay-up length plus one-half the width of strands on the first conveyor 30.

Figure 5:
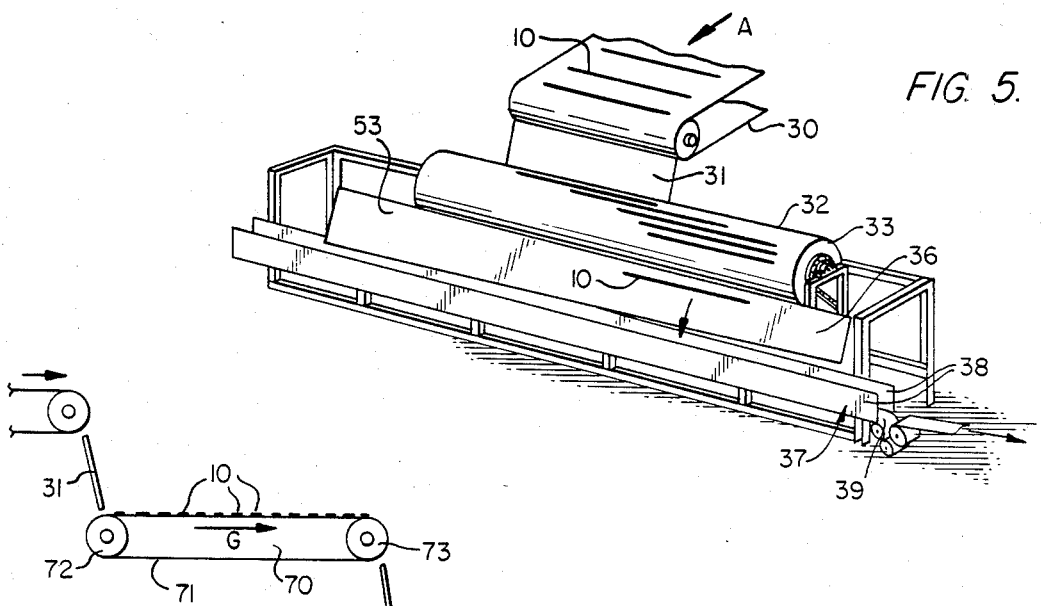
FIG. 5 is an isometric view schematically showing an apparatus according to the present invention for producing composite products, including a rotating drum assembly.
Figure 6:
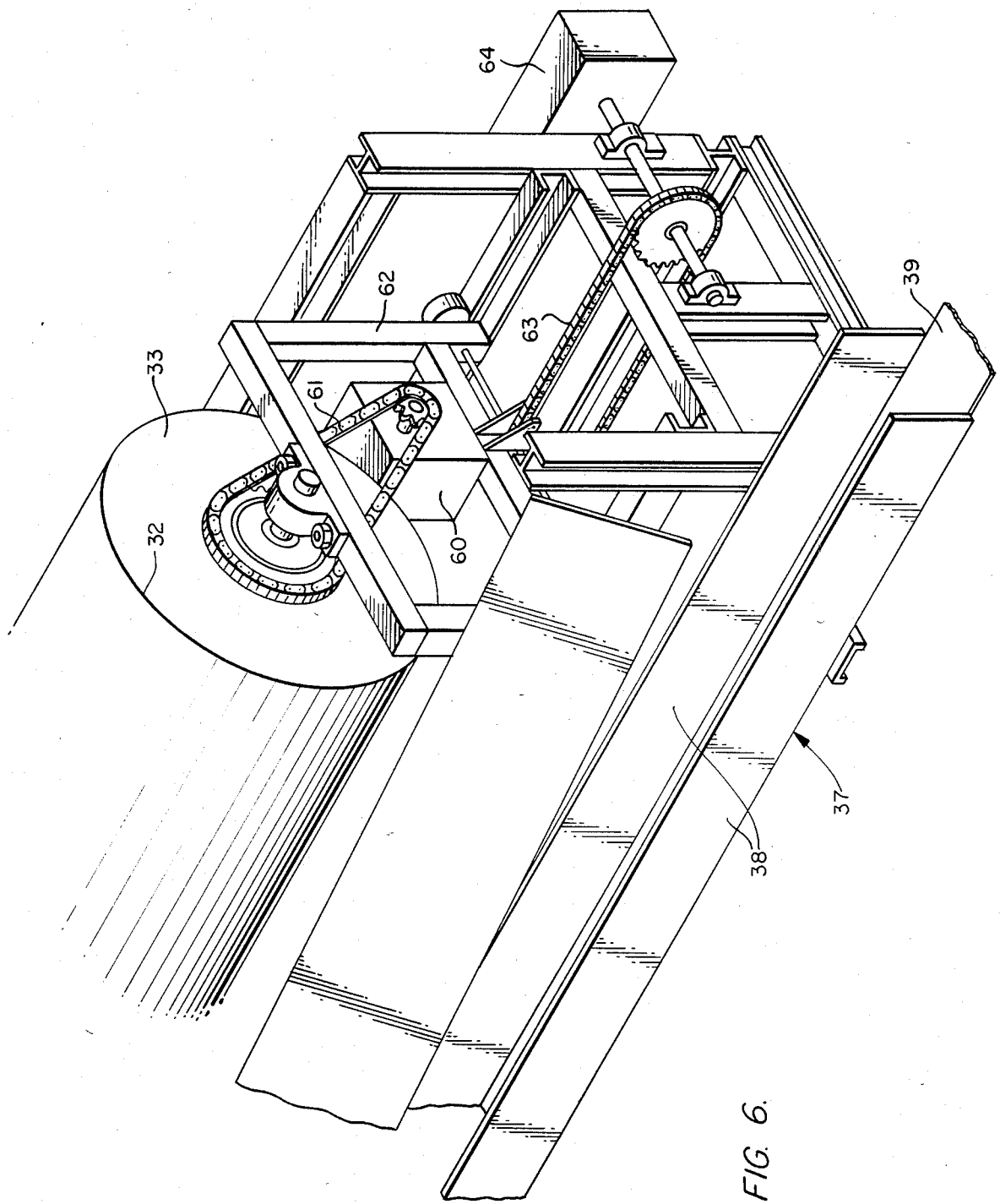
FIG. 6 is an isometric view schematically showing the rotating drum assembly also shown in FIG. 5.

FIGS. 5 and 6 schematically illustrate an apparatus for the continuous manufacture of a composite adhesively bonded product made from substantially straight strands, such as wood strands. Strands 10 with an adhesive coating are placed side-by-side in a generally parallel relationship and advance on a first conveyor means, e.g., conveyor 30. The strands 10 are conveyed on a conveyor 30 in the direction shown by arrow A. The strands 10 drop off the transverse conveyor 30 and are directed by means of a guide 31 to the friction surface on a second conveying means, e.g., a rotating drum 33.

As illustrated in FIGS. 3 and 4, the drum 33 rotates slowly and also reciprocates within a path in line with the drum axis so that the strands 10 are deposited along the drum 33 in a progressive pattern. As the drum 33 rotates, the strands 10 fall onto a chute 36 which reciprocates backwards and forwards, parallel to the strand length, to lay the strands 10 in a mat 21 (not shown) within a lay-up trough 37 contained by stationary sides 38 and a third conveyor means, e.g., conveyor belt 39. While the bottom of the trough is shown as angled, it can be horizontal, if desired. The mat 21 on the conveyor 39 may be conveyed through a continuous press where the strands 10 in the mat 21 are compressed and cured. For thermosetting resins such as phenol-formaldehyde heating may be employed to cure the resin.

As illustrated in FIG. 6, the drum 33 may be rotated by a gear drum drive motor 60 and a chain drive 61. The drum drive motor 60 and drum 33 are mounted on a trolley 62 which reciprocates in a predetermined path by means of a chain 63 driven by a geared reciprocating motor system 64. As previously mentioned, the various factors can be correlated to provide the desired height of the mat.

In one typical apparatus, the strand conveyor 30 had a width of about 9 feet, and the drum 33 had a diameter of about 3 feet and a length of 21 feet (with a strand receiving length of about 19 feet). The drum transversely traveled 11 feet with a speed of about 30 seconds per cycle and a rotational speed of one rotation each 50 seconds. The lay-up distance was about 30 feet. The surface 36 moved back and forth in about a 10–15 second cycle. The conveyor 36 was 12 inches wide and moved at a speed of about $\frac{3}{4}$ to $1\frac{1}{4}$ feet per minute.

Figure 7:
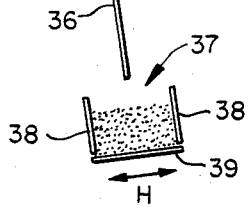
FIG. 7 is an elevation of an alternative to the drum of FIG. 3.

An alternative to the drum 33 is shown in FIG. 7. In FIG. 7, the surface 31 guides strands 10 to reciprocating conveyor 70 which is composed of endless conveyor belt 71 which moves around guides 72 and 73 in the direction shown by arrow G. Strands 10 are moved along the upper run of conveyor 70 around guide 73 and move down surface 36 into trough 37 having side walls 38 and conveyor 39. In the embodiment shown, conveyor 37 is reciprocated back and forth as shown by arrows H to provide a distribution of strands 10 across conveyor 39. In one case, a conveyor 70 such as shown in FIG. 7 had a width of about $31\frac{1}{2}$ feet and a transverse travel so that the lay-up distance was about 50 feet in order to provide a lay-up mat thickness of about 12 inches and a consequent final compressed product thickness of about 4 inches.

The apparatus of FIG. 7 is equivalent to a drum of a very large radius since the residence time of the strands on the upper run of conveyor 70 is equivalent to the residence time of the strands on the drum surface and correlates with the reciprocating cycle. Moreover, since guides 73 can have a relatively small diameter (e.g., 1 foot or less) the point at which the strands disengage from conveyor 70 remains relatively constant and can be closely controlled. Both the apparatus of FIG. 3 and of FIG. 7 can be considered to include a rotating member, e.g., the drum 33 of FIG. 3 and the conveyor 70 of FIG. 7.

Figure 8:
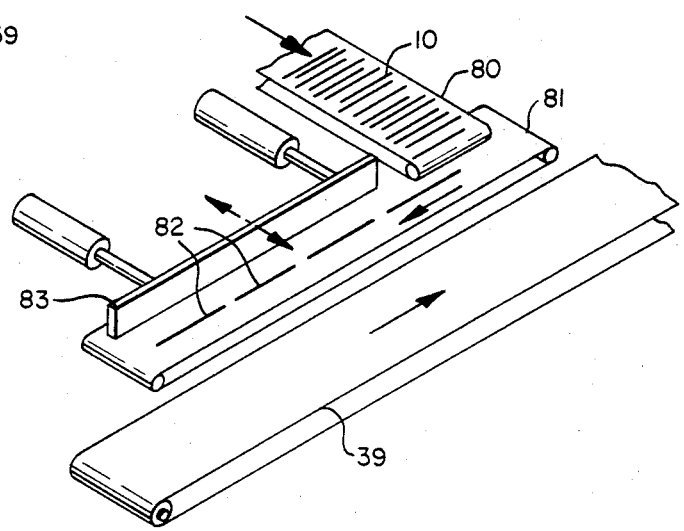
FIG. 8 is a schematic isometric view showing another embodiment of the apparatus of the present invention for laying elongated members in a lay-up mat.

Yet another embodiment of an apparatus for carrying out the process of the present invention is disclosed in FIG. 8. Strands 10 containing resin advance laterally on a transverse conveyor 80 in a direction substantially normal to their length and are deposited individually onto a longitudinal conveyor 81 moving in a direction generally parallel (but in an opposite direction) to conveyor 39. The strands 10 move generally in the direction of their length in a row 82 on the longitudinal conveyor 81 until the first strand 10 in the row 82 reaches a predetermined position on the longitudinal conveyor 81, when a lateral sweeping arm 83 (e.g., a brush, rubber strip, board, plate or the like) pushes the row 82 of strands 10 off the longitudinal conveyor 81 onto the conveyor 39 in a trough 37 (not shown). The predetermined position may be, for example, near the end of the longitudinal conveyor 81. The resulting mat is similar to that shown in FIG. 2. It will be appreciated that conveyor 81 may move forward and backward across conveyor 39 to deposit strands across the width of conveyor 39.

In a further embodiment, the longitudinal conveyor 81 is adapted to tip sideways when strands 10 reach the predetermined position on the conveyor 81, and the longitudinal conveyor 81 is positioned so that when it tips sideways, the strands fall onto the mat conveyor 39. In this manner, the sweeping arm 83 may not be needed. In still another embodiment, the longitudinal conveyor 81 may travel in substantially the same direction as the lay-up conveyor 39, but at a higher speed so that strands 10 can be pushed from the longitudinal conveyor 81 to the mat conveyor 39 to provide a substantially uniform rate of deposition. It will be understood that conveyor 39 can reciprocate laterally, or that a reciprocating surface corresponding to surface 36 of FIG. 3 can be employed, for example, to distribute strands laterally across conveyor 39.

The lay-up systems of this invention can effectively align strands parallel to the run of a continuous conveyor, in both vertical and lateral directions. However, it needs to be recognized that in any continuous mat with a depth beyond the thickness of one strand there will be some card-decking. The systems also tend to maximize the minimum distance between any two strand ends, which effectively reduces clustering of strand ends with a resulting area of weakness.

It is to be understood that while the apparatus embodiments disclosed effectively may be used to carry out the process of the invention, any other means capable of depositing layers of strands over a predetermined length of the lay-up conveyor to substantially eliminate card-decking orientation, also may be employed. For example, strands may be deposited on a continuously moving conveyor in a trough from at least two lateral conveyors positioned on the same side of the conveyor or staggered on each side of the moving conveyor on which the mat is being formed. In such embodiment, at least two transverse conveyors are positioned over the lay-up trough and deposit strands onto the moving belt conveyor over the desired length relative to the length of the strands and the final thickness of the product as discussed earlier. The conveyors can be immediately adjacent to each other or can be spaced from each other so long as the requirements for overall length of deposit are met. The conveyor which holds the continuous lay-up mat can be reciprocated back and forth to provide strand deposit across the width of the lay-up, the end of the transverse conveyors can be reciprocated back and forth, or a reciprocating guide means positioned below the transverse conveyors can be used.

This invention is applicable to strands generally. Particular benefits in reducing bowing is obtained when the product contains resilient strands. Wood is a particularly preferred strand material. Other materials include, without limitation, fiber glass in a resin matrix and synthetic or natural cords in an elastic matrix such as rubber.

It will be apparent to those skilled in the art that various changes may be made in the details of the process and apparatus of the present invention as described herein and shown in the drawings without departing from the scope of the present invention which is limited only by the claims.

We claim:

1. A process for continuously forming a composite product having elongated resin coated members at least about one foot long which are oriented, compressed and bonded to provide a composite product which comprises depositing said elongated members on a moving carrier in a lay-up trough with an orientation that is substantially parallel to the direction of movement of said carrier, said members being deposited on said carrier over a length of carrier that is at least as long as about one and one-half times the length of said elongated members and is at least as long as about 30 times the final thickness of the composite product, thereafter compressing and bonding said elongated members producing said composite product where the average vertical orientation of said elongated members in said composite product is not more than about 2 degrees in a longitudinal direction.

2. The process of claim 1 in which said length of said carrier is at least as long as about 60 times the final thickness of said composite product.

3. The process of claim 1 in which said length of said carrier is at least as long as about 110 times the final thickness of said composite product.

4. The process of claim 1 in which said elongated members are wood strands at least about 3 feet long.

5. The process of claim 2 in which said elongated members are wood strands at least about 3 feet long.

6. The process of claim 3 in which said elongated members are wood strands at least about 3 feet long.

7. The process of claim 1 in which said elongated members are wood strands at least about 8 feet long.

8. The process of claim 2 in which said elongated members are wood strands at least about 8 feet long.

9. The process of claim 3 in which said elongated members are wood strands at least about 8 feet long.

10. The process of claim 1 in which the final thickness of said compressed composite product is at least about 4 inches.

11. The process of claim 4 in which said wood strands have a width and thickness of from about 1/16 inch to about 1 inch.

12. The process of claim 1 in which said elongated members are at least about 3 feet long and have a width and thickness of from about 1/16 inch to about 1 inch and in which the final thickness of said compressed composite product is at least about 4 inches.

* * * * *